United States Patent [19]

Kaufman

[11] 4,243,771

[45] Jan. 6, 1981

[54] NITRILE RUBBER ADHESION

[75] Inventor: Martin H. Kaufman, China Lake, Calif.

[73] Assignee: The United States of America as represented by the Secretary of the Navy, Washington, D.C.

[21] Appl. No.: 95,866

[22] Filed: Nov. 19, 1979

[51] Int. Cl.$^3$ .............................................. C08F 8/12
[52] U.S. Cl. .................................. 525/340; 427/322; 525/341; 525/344; 525/355
[58] Field of Search ................ 427/322; 525/340, 341, 525/344, 355

[56] References Cited

U.S. PATENT DOCUMENTS

| 2,873,164 | 2/1959 | Hindle et al. ............................. 8/108 |
| 3,404,996 | 10/1968 | Deichert et al. ....................... 427/322 |
| 3,450,465 | 6/1969 | Prance et al. ......................... 427/322 |
| 3,867,174 | 2/1975 | Maekawa et al. ..................... 427/322 |
| 3,948,870 | 4/1976 | Stoy et al. ............................ 260/85.5 |

*Primary Examiner*—William F. Hamrock
*Attorney, Agent, or Firm*—R. S. Sciascia; W. Thom Skeer; Luther A. Marsh

[57] ABSTRACT

This invention discloses a method for converting a nitrile rubber substrate surface to a chemically active surface whereupon said surface reacts with an adhesive to form a permanent bond with said adhesive. The nitrile rubber substrate surface is so converted by treatment with a dilute mineral acid.

15 Claims, No Drawings

NITRILE RUBBER ADHESION

BACKGROUND OF THE INVENTION

Previous treatments of nitrile rubbers and similar copolymers with strong acids resulted in deleterious alteration of the rubber. Current work indicates that azine, amide, sulfonic acid, sulfates, hydroxyl and cyclization form from treatment of nitrile rubber with concentrated sulfuric acid. After such treatment the rubber surface becomes hard and stressed, a layer beneath the hardened surface is weakened and subsequent reaction with an epoxy results in some covalent bonds which are prone to hydrolysis or destruction by other reactions. Moreover, the unsaturation concentration decreases. The rubber thus losing its rubbery property becomes useless and in fact dangerous to employ particularly, in modern military systems, as well as, commercially.

Although no literature on the subject of nitrile rubber surface hydrolysis was observed, references concerning nitrile and amide hydrolysis appear to span about forty years. What is revealed is that nitrile hydrolysis requires rigorous conditions of heat and strong base or acid. Rabinovitch et al., Canadian Journal of Research, 20-secB 121 1942 studied the hydrolysis of propionitrile in aqueous hydrochloric acid solutions. In acid concentrations above 4N they found that the overall rate of hydrolysis was dependent upon the decomposition of intermediate amide and below acid concentrations of 4N, the nitrile decomposition was rate determining. Increasing the acid concentration from 5N to 6.48N resulted in an hydrolysis rate constant increase from 0.0174 $hr^{-1}$ to about 0.1 $hr^{-1}$. M. L. Kilpatrick, J. Am. Chem. Soc., 69 40 1947 showed that the rate of hydrolysis of cyanamide was the same in dilute solutions of various strong acids. In HCL, it was found that the rates rose with acid concentration but then dropped off at a relatively low acid concentration. Sperber et al., Journal of American Chemical Society 70, 3091 1948 shows the hydrolysis of tributyl acetonitrile in strong sulfuric acid delivers high yields of amide. The same authors were unable to hydrolyze tributyl acetamide at elevated temperatures in phosphoric, concentrated hydrochloric, or sulfuric-acetic acid mixture. They concluded sterically hindered amides are very difficult to hydrolyze. Tsai et al., Journal of the American Chemical Society, 79, 2530 1957 in studying steric effects in the hydrolysis of hindered amides and nitriles came to the same conclusion as Sperber et al.

SUMMARY OF THE INVENTION

The purpose of this invention is to provide a practical way to make nitrile rubbers adhere, by use of adhesives, to a variety of substrates including metals, wood, rubbers, etc. A nitrile rubber has a structure which is conducive to the formation of an AB block copolymer. An AB block copolymer is defined as two individual polymers joined by a covalent bond. It is observed that certain conditions must exist in order for the adhesion of nitrile rubbers by covalent bonds to exist; (1) the surface nitrile groups must be accessible for reaction, (2) groups on the surface of the rubber must be transformable to new groups which will react with adhesive, (3) the transformation must take place, and (4) the new groups must be accessible to adhesive functional groups. This invention illustrates that the nitrile functions on the rubber surface can be hydrolyzed to carboxyl groups by mild conditions without deleteriously altering the rest of the surface. Thus, in effect, a suitable block A having a reactive functional group will be locked into the rubber surface, providing a site for covalently bonding to block B which will be locked into the adhesive. In order to make a nitrile rubber covalently bond to a common adhesive, like epoxy, the rubber surface must be made reactive to epoxy. The method illustrated in this invention for increasing the reactivity of the rubber to epoxy is hydrolyzation of the nitrile groups to acid groups without affecting unsaturation. This is done by treating the rubber with dilute mineral acids. By leaving unsaturation in tact, the rubbery properties of the surface remain and no stresses are built up. The bonds formed after the treatment are stable to hydrolysis. This invention illustrates that mild conditions based upon dilute solutions of mineral acids at low temperatures and for relatively short periods of time serve to hydrolyze nitrile functions on the surface of nitrile rubber.

OBJECTS OF THE INVENTION

It is an object of the instant invention to avoid one or more drawbacks of the prior art. Another object of the present invention is a novel method for converting a nitrile rubber substrate surface into an adhesion surface for metals, wood, and rubbers. It is another object of the invention to provide an improved method for the treatment of nitrile rubber with dilute mineral acids wherein the nitrile rubber retains its rubbery characteristics and is stable. A still further object of the invention is to provide a nitrile rubber substrate surface wherein the treated surface upon bonding is so strong that it cannot be disrupted. Other objects and advantages of the instant invention will become more apparent as the description proceeds hereinafter. The following example is further illustrative of the present invention; and it will be understood, however, that the invention is not limited thereto.

EXAMPLE

Treatment of Cured Nitrile Rubber Surface with Acid at 60° C.

| Acid | Time of Treatment, minutes | Peel Strength with Epoxy Adhesive, lbs/in. | Peel Strength after Salt Water Exposure, 280 Hrs at 50° C., lbs/in. |
| --- | --- | --- | --- |
| 10% HCl | 0.5 | 120 | 110 |
| 10% HCl | 1.0 | 98 | 110 |
| 10% HCl | 3.0 | 128 | 180 |
| 10% HCl | 12.0 | 118 | 118 |
| 10% HCl | 30.0 | 122 | 140 |
| 10% $H_2SO_4$ | 7.0 | 115 | 67–122 |
| 10% $HNO_3$ | 7.0 | 69–87 | 8–10 |
| 10% $H_3PO_4$ | 7.0 | 90–125 | 97–115 |

HYDROLYSIS STUDY

A Perkin Elmer 137 sodium chloride spectrophotometer is used to study the rates of hydrolysis of nitrile in pressed thin films of Uniroyal Chemical's butadiene-acrylonitrile copolymer, designated Paracril CLT. The reactions of the surface of CLT are studied by means of a Perkin Elmer 221 infrared reflectance spectrophotometer. A cured Paracril CLT rubber stock containing FEF Black and the usual rubber curatives, accelerators, etc. is cut into tensile test specimens and subjected to surface hydrolysis reactions. Test specimens are adhered to each other with a stoichiometric mixture of Ciba-Geigy CG-Araldite 502 epoxy resin product of the reaction between bisphenol A and epichlorohydrin and CG-polyamide 955 cured for seven days at ambient temperature and humidity. The specimens are pulled at 180° (T-peel) using an Instron tester at crosshead speed of 0.085 cm/sec. After approximately one-half of each tensile tested specimen had been destroyed, a razor blade cut to the glue line is made at the undestroyed interface. The samples are then immersed in warm salt (3% NaCl) water to study the effect of hydrolytic conditions on the bond.

REFLECTANCE SPECTROSCOPY

Based upon reflectance spectroscopic studies, reactions taking place on the surface of CLT treated with concentrated hydrochloric acid for five minutes at 44° C. are as follows: (a) unsaturation concentration (580 and 1640 $cm^{-1}$) decreased, (b) hydrochlorination (800 $cm^{-1}$) took place, (c) nitrile concentration (2250 $cm-1$) decreased. A broad increase of absorption at 1730 $cm^{-1}$ (carbonyl) and a shoulder in the 3100–3400 $cm^{-1}$ (OH and NH) region are indicative of carboxyl and amide functions.

In general, the introduction of new groups, particularly oxygenated groups, into a nitrile containing molecule results in a "quenching" of the C≡N absorption intensity. In the present case the intensity of C≡N absorption is strong.

It is not clear to what depth the infrared radiation penetrates the samples in the reflectance studies. Concentrated hydrochloric acid apparently reacts so quickly to convert nitrile to amide that the surface soon swells, permitting penetration of the acid into the sample. Subsequent hydrolysis to amide then takes place at some depth within the rubber while complete hydrolysis to carboxyl takes place on the surface. Although the transformation of nitrile to amide with dilute acid is apparently slow, subsequent hydrolysis of formed amide is rapid, and the rate is dependent, to some extent, on water concentration and penetration into the sample. Based upon the history of nitrile hydrolysis reactions where strong base or acid and elevated temperatures were required for extensive periods of time, it was unexpected that nitriles on the nitrile rubber surface could be hydrolyzed with such mild conditions as room temperature, very dilute acid, and short periods of time. It is suspected that the morphology of the nitrile rubber surface is such that the barriers to hydrolysis have been lowered. The rates of consecutive reactions taking place in dilute acid solution are fast enough, within the time frame of the present experiments, to permit much hydrolysis on the sample surface.

If the cured rubber surface is clean, a five minute treatment with 0.01N HCl (0.036% HCl) at 23° C. is sufficient to provide it with substantial epoxy bonding capability. This was illustrated with a freshly milled and pressed sample immersed for five minutes at room temperature in a 0.01N HCl solution containing 7:1 water: isopropanol and 2% surfactant. The isopropanol and surfactant helped to cleanse the rubber surface. Surfactants such as alkalimetal dialkyl sulfosuccinates were found to provide good cleaning action in conjunction with alcohols, esters, and ketones. Other suitable cleansing solvents and surfactants are known to the art. Thus, a freshly milled and press-cured sample was immersed in isopropanol for five minutes and then immersed in a solution containing 0.037% HCl, 2% sodium dioctyl sulfosuccinate, in 7 to 1 water-isopropanol for five minutes before water rinsing and air drying. Subsequent epoxy bonding followed by peel tests resulted in 100% cohesive failure of the rubber.

THIN FILM TRANSMISSION SPECTROSCOPY

The conclusions drawn from the reflectance studies on acid-treated thick samples are supported by the increase of carboxyl at the expense of nitrile, which with thin films was found to be in the following order:

| concentrated HCl | 6N HCl | 2N HCl |
|---|---|---|
| 5 min, 44° C. | 5 min, 44° C. | 30 min, 75° C. |

A thin film of CLT exposed to 55° C. water for 20 hours had an even greater ratio of carboxyl to nitrile than any of the above. In no case was there any evidence of unhydrolyzed amide.

180° PEEL TESTS

An attempt is made to correlate physical tests with the rate of hydrolysis of nitrile functions on the surface of a nitrile rubber stock composed primarily of CLT. It is found that the strength of the rubber is the limiting factor in the adhesive-rubber system. In no case of hydrochloric acid treated rubber is the glue line disrupted. The data in Tables 1 and 2 reveal that relatively short exposure to dilute hydrochloric acid are sufficient to provide an adequate number of carboxyl groups for strong bonding via the formation of covalent bonds with epoxy.

TABLE 1

The Effect of Surface Hydrolysis of Nitrile Functions by Dilute HCl at 60° C. on the Adhesion of Nitrile Rubber and the Stability of the Carboxy-Epoxy Bond

| Treatment time, min | Peel strength before salt water immersion lbs/in | Peel strength after salt water immersion at 50° C. for 280 hr. lbs/in. |
|---|---|---|
| 0.0 | 5 | — |
| 0.5 | 120 | 110 |
| 1.0 | 98 | 110 |
| 3.0 | 128 | 180 |
| 7.0 | 136 | 100 |
| 13.0 | 118 | 114 |
| 30.0 | 122 | 140 |

TABLE 2

The Effect of Temperature on Nitrile Rubber Surface Reactions With 10% HCl for Three Minutes, Adhesive Strength to Epoxy

| Temperature, °C. | Peel strength before salt water immersion, lbs/in. | Peel strength after 280 hr immersion in salt water at 50° C., lbs/in. |
|---|---|---|
| 50 | 136 | 119 |
| 60 | 128 | 180 |
| 70 | 125 | 112 |
| 80 | 115 | 106 |

Since the adhesive bond is not disrupted, the variations in peel strength values are attributed to variations in the cohesive strengths of the rubber stocks. Such variations can come about by lack of homogeneity of the rubber and by small differences in rubber curing conditions.

CLT contains about 25% acrylonitrile. Only a portion of the nitrile functions near the rubber surface are likely to be accessible to hydrolysis, for steric factors have an influence on the reactions. The test results therefore illustrate that only a small number of covalent bonds are sufficient to bring about large increases in adhesive strength.

Although nitrile hydrolysis on the surface of nitrile rubber can be brought about without acid, the reaction with water is slow. The adhesive peel strength resulting from a rubber specimen treated with 70° C. water for 20 minutes is 20 lbs/in.

The results shown in Table 3 illustrate the fact that all strong acids do not react in the same fashion with nitrile rubber surface. In each case, the rubber surface is treated with 10% acid at 60° C. for seven minutes.

TABLE 3

Effect of Acid Surface Treatment on the Strength of the Rubber-Epoxy Bond

| Acid | Peel strength before salt water immersion, lbs/in. | Peel strength after salt water immersion for 280 hrs at 50° C., lbs/in. |
|---|---|---|
| $H_2SO_4$ | 115 | 50–92 |
| $HNO_3$ | 69–87 | 8 |
| $H_3PO_4$ | 90–125 | 97–115 |
| HCl | 136 | 100 |

The variations of peel strength shown in the table are due to a combination of failure modes—cohesive failure of the rubber and adhesive bond line failure. Only the adhesive bond line of the hydrochloric acid and the phosphoric acid treated samples remained completely intact. The reduction of their peel strength values after subjection to the hydrolytic conditions of salt water may be attributed to inhomogeneity in the rubber which failed cohesively over a range of strengths.

As many variations within the spirit and scope of the invention will occur to those skilled in the art, it is understood that the invention is not limited to the specific embodiments thereof except as set forth in appended claims.

What is claimed is:

1. A method for converting a dilute nitrile rubber substrate surface into a bondable surface for metals, wood, and rubbers which comprises hydrolyzing said nitrile substrate surface in the presence of a mineral acid under such mild conditions that said hydrolyzing does not affect the unsaturation of said nitrile substrate surface.

2. A method as in claim 1 wherein said mineral acid is selected from the group consisting of hydrochloric, sulfuric, and phosphoric acids.

3. A method as in claim 2 wherein said hydrolyzing conditions comprise the mineral acid is a dilute mineral acid, the time of treatment of said nitrile rubber substrate surface is from about 0.25 minute to about 45 minutes.

4. A method as in claim 3 wherein said mineral acid is from about 0.03 to about 15 percent acid.

5. A method as in claim 4 wherein said hydrolyzing conditions are further characterized by converting the —CN groups on the nitrile rubber substrate surface to carboxyl groups without forming subsequent reactions.

6. A method as in claim 1 wherein said surface is cleaned with an organic solvent prior to being hydrolyzed.

7. A method as in claim 6 wherein said surface cleaning is carried out in the presence of a surfactant and water.

8. A method as in claim 7 wherein said surfactant is present in an amount of from about 0.1% to about 1 2.0%.

9. A method for converting a nitrile rubber substrate surface into a bondable surface for metals, wood, and rubbers which comprises cleaning said surface with an organic solvent, and hydrolyzing said nitrile substrate surface in the presence of a dilute mineral acid under such mild conditions that said hydrolyzing does not affect the unsaturation of said nitrile substrate surface.

10. A method as in claim 9 wherein said mineral acid is selected from the group consisting of hydrochloric, sulfuric, and phosphoric acids.

11. A method as in claim 10 wherein said hydrolyzing conditions comprise the mineral acid is a dilute mineral acid, the time of treatment of said nitrile rubber substrate surface is from about 0.25 minute to about 45 minutes.

12. A method as in claim 11 wherein said mineral acid is from about 0.03 to about 15 percent acid.

13. A method as in claim 12 wherein said hydrolyzing conditions are further characterized by converting the —CN groups on the nitrile rubber substrate surface to carboxyl groups without forming subsequent reactions.

14. A method as in claim 9 wherein said surface cleaning is carried out in the presence of a surfactant and water.

15. A method as in claim 14 wherein said surfactant is present in an amount of from about 0.1% to about 2.0%.

* * * * *